United States Patent
Sethi et al.

(10) Patent No.: US 9,609,273 B2
(45) Date of Patent: Mar. 28, 2017

(54) SYSTEM AND METHOD FOR NOT DISPLAYING DUPLICATE IMAGES IN A VIDEO CONFERENCE

(71) Applicant: Avaya Inc., Basking Ridge, NJ (US)

(72) Inventors: Ravi Sethi, Far Hills, NJ (US); Parameshwaran Krishnan, Basking Ridge, NJ (US); Navjot Singh, Somerset, NJ (US)

(73) Assignee: Avaya Inc., Basking Ridge, NJ (US)

( * ) Notice: Subject to any disclaimer, the term of this patent is extended or adjusted under 35 U.S.C. 154(b) by 233 days.

(21) Appl. No.: 14/084,780

(22) Filed: Nov. 20, 2013

(65) Prior Publication Data
US 2015/0138302 A1    May 21, 2015

(51) Int. Cl.
*H04N 7/15* (2006.01)

(52) U.S. Cl.
CPC ..................... *H04N 7/15* (2013.01)

(58) Field of Classification Search
USPC ..................................................... 248/14.07
See application file for complete search history.

(56) References Cited

U.S. PATENT DOCUMENTS

| | | | | |
|---|---|---|---|---|
| 7,277,118 B2* | 10/2007 | Foote | ..................... | G06T 3/4038 348/218.1 |
| 8,269,816 B2* | 9/2012 | Pun | ......................... | H04N 7/15 348/14.1 |
| 8,289,363 B2* | 10/2012 | Buckler | ................... | H04N 7/15 348/14.08 |
| 2003/0067536 A1* | 4/2003 | Boulanger | ............... | H04N 7/15 348/14.08 |
| 2010/0085415 A1* | 4/2010 | Rahman | .................... | G01S 3/80 348/14.08 |
| 2014/0007257 A1* | 1/2014 | Dougherty | ............. | G09B 5/062 726/28 |

* cited by examiner

*Primary Examiner* — Amal Zenati
(74) *Attorney, Agent, or Firm* — Sheridan Ross P.C.

(57) ABSTRACT

A video conference is established between a first video device and a second video device. The first video device captures a first participant's images in the video conference. The first participant's image is also captured as part of the video conference via the second video device (i.e., there are duplicate images of the first participant's image being captured). The first participant's image is detected as being captured by the first video device and the second video device in the video conference. For example, the duplicate images can be determined based on facial recognition. In response to detecting that the first participant's image is being captured by the first video device and the second video device in the video conference, the process automatically forbears from displaying at least one of the first participant's image captured by the first and second video devices.

20 Claims, 6 Drawing Sheets

SYSTEM AND METHOD FOR NOT DISPLAYING DUPLICATE IMAGES IN A VIDEO CONFERENCE

TECHNICAL FIELD

The systems and methods disclosed herein relate to conferencing systems and in particular to video conference systems.

BACKGROUND

In many instances, when a video conference is initiated, the video conference will include video from a video conference room. Nowadays, participants who are in the video conference room may bring their personal devices, such as a tablet device and login to the video conference with their personal device. This is useful since the user can share documents and give presentations using their personal device.

However, this also causes problems with how participants are viewed in the video conference. By default, the video camera in the conference room shows the image of all or most of the participants in the conference room. In addition, the same participants can be seen in the video conference based on a video camera in the participant's personal video devices. This image duplication creates a sub-optimal user experience and can cause confusion for attendees of the video conference. What is needed is a way to manage this duplication of images in a video conference.

SUMMARY

Systems and methods are provided to solve these and other problems and disadvantages of the prior art. A video conference is established between a first video device and a second video device. The first video device captures a first participant's images in the video conference. The first participant's image is also captured as part of the video conference via the second video device (e.g., there are duplicate images of the first participant's image being captured by different devices). The first participant's image is detected as being captured by the first video device and the second video device in the video conference. For example, the duplicate images can be determined based on facial recognition. In response to detecting that the first participant's image is being captured by the first video device and the second video device in the video conference, the process automatically forbears from displaying at least one instance of the first participant's image (e.g., the first participant's image captured by the second video device or the first participant's image captured by the first video device).

DETAILED DESCRIPTION

Figure 1:
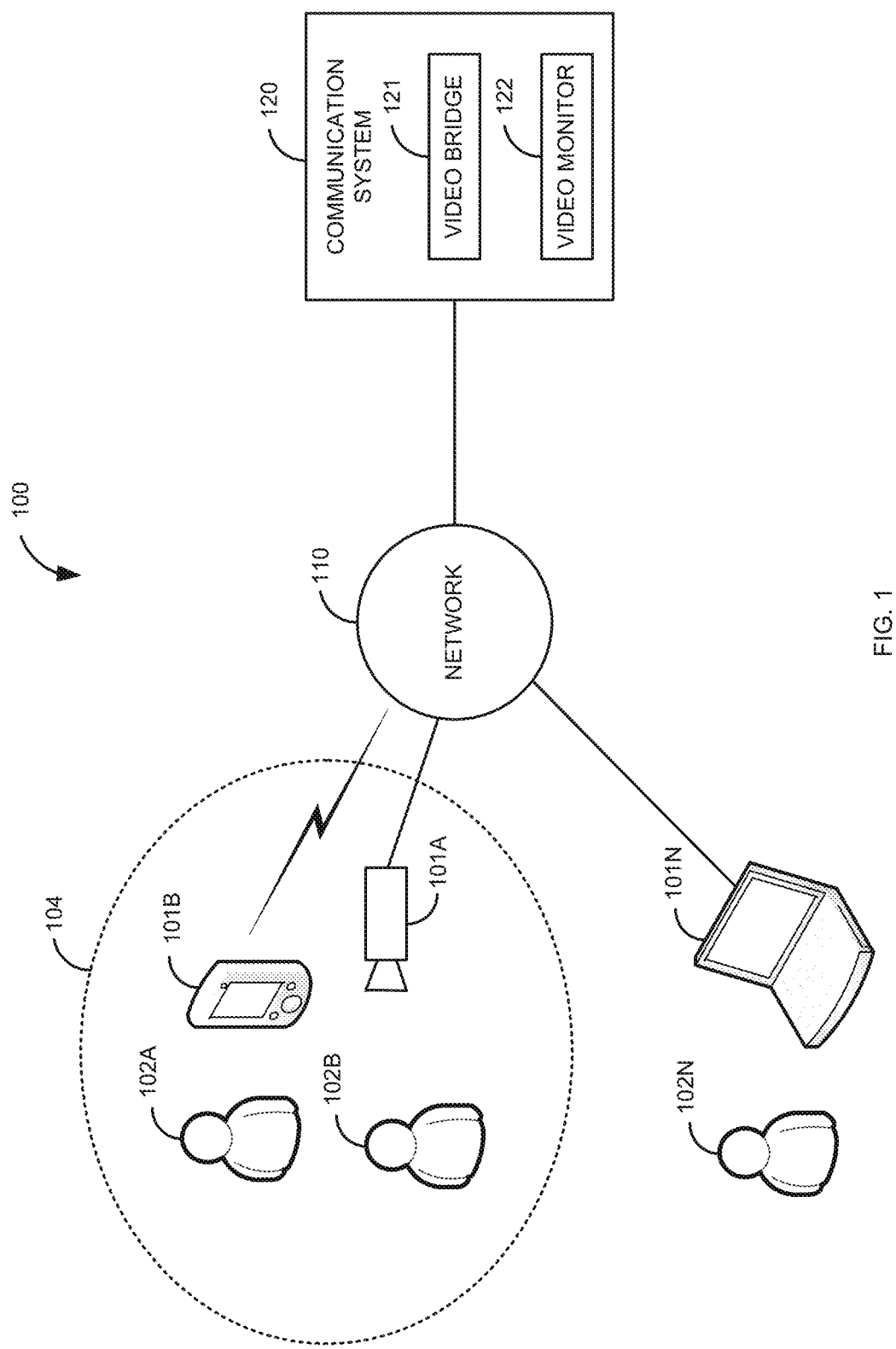
FIG. 1 is a block diagram of a first illustrative system for not displaying duplicate images in a video conference.

FIG. 1 is a block diagram of a first illustrative system 100 for not displaying duplicate images in a video conference. The first illustrative system 100 comprises video devices 101A-101N, participants 102A-102N, a conference room 104, a network 110, and a communication system 120.

The video device 101 can be or may include any device that can send or receive video information on the network 110, such as a Personal Computer (PC), a video telephone, a video system, a cellular telephone, a Personal Digital Assistant (PDA), a tablet device, a notebook device, a video camera, and the like. As shown in FIG. 1, any number of video devices 101A-101N may be connected to network 110. In addition, the video devices 101A-101N may be directly connected to the communication system 120. The video device 101 can be any device that can capture the video of multiple (i.e., a plurality) participants 102 in a conference. The video device 101 may comprise multiple video cameras to capture all the participants 102 participating in the video conference in the conference room 104.

The participants 102 can be anyone who is participating in a video conference. The participants 102 may be located in the conference room 104 as shown by the participants 102A-102B. Any number of participants 102 may be located in the conference room 104. The participants 102 may be located in a remote location, such as shown by the participant 102N.

The network 110 can be or may include any network that can send and receive information, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), H.264, H.263, H.261, and/or the like.

The communication system 120 may be or may include any device that can route video communications, such as a video switch, a video router, a video server, a video communication system, and/or the like. In FIG. 1, the communication system 120 is shown as a single device. However, in some embodiments, the communication system 120 may be distributed in the network 110. The communication system 120 comprises a video bridge 121 and a video monitor 122. The video bridge 121 and the video monitor 122 may also be distributed in the network 110.

The video bridge 121 can be or may include any hardware/software that can route and/or bridge video communications. The video bridge 121 may mix multiple video streams from the video devices 101A-101N. The video bridge 121 may route multiple video streams sent from the video devices 101A-101N. The video monitor 122 can be or may include any hardware/software that can manage and monitor video streams.

The video bridge 121 establishes a video conference between the first video device 101A and a second video device (or devices) 101B. The video conference can be established in various ways. For example, the video conference can be established by the video bridge 121 calling the video device 101A and the video device(s) 101B-101N. The video conference can be established by the participants 102 calling into the video bridge 121 via the video devices 101A-101N.

The video bridge 121 captures the participants 102A and optionally 102B's images in the video conference via the first video device 101A. Although not shown, the video bridge 121 can capture additional participant's images if the additional participants 102 are in the conference room 104. The video bridge 121 captures the participant 102A's image in the video conference via the second video device 101B. The participant 102A may join the video conference via the second video device 101B because he/she wants to present during the meeting using the second video device 101B.

The video monitor 122 detects that the participant 102A's image is being captured by the first video device 101A and the second video device 101B in the video conference. In response to detecting that the participant 102A's image is being captured by the first video device 101A and the second video device 101B in the video conference, the video monitor 122 automatically forbears from displaying at least one of the first participant 102A's image captured by the first video device 101A and/or the second video device 101B. Which image(s) of the first participant 101A that is displayed (or not displayed) can be accomplished based on an administrative setting, based on how clear the image is, based on a resolution of the image, and/or the like. In one embodiment, the image that is not displayed is the image from the second video device 101B. Alternatively, the image that is not displayed can be the image from the communication device 101A.

As discussed above, the video monitor 122 automatically forbears from displaying at least one of the first participant 102A's image. In an alternative embodiment, the participant 102A is provided an option to automatically forbear from displaying the participant 102A's image from the first or second video device 101B. The participant 102A may elect to allow his/her image to be displayed or not and from which source the image is displayed from.

Forbearing from displaying the participant's image can be accomplished in various ways, such as by sending a message to the second video device 101B to stop sending a video stream of the participant 102A. Alternatively, the video bridge 121 (or any other device in the network 110) can disable routing the video stream so that the participant 102A's image is not displayed as part of the video conference.

The above example only discusses a single participant's (102A) image not being displayed. However, this process can be repeated for additional participants (e.g., participant 102B) if the additional participants are part of the video conference captured by the first video device 101A and the video device 101 associated with a specific participant. In another embodiment, this process can be repeated for two or more participants 102 (e.g., participant 102A and participant 102B) being captured by a single second video device 101B. In an alternative embodiment, individual ones of participants 102 being captured by a single second video device 101 may be prevented from being displayed. In one embodiment, the first video device is a conference room video device and the second video device 102B is an individual participant video device, such a notebook device.

Figure 2:
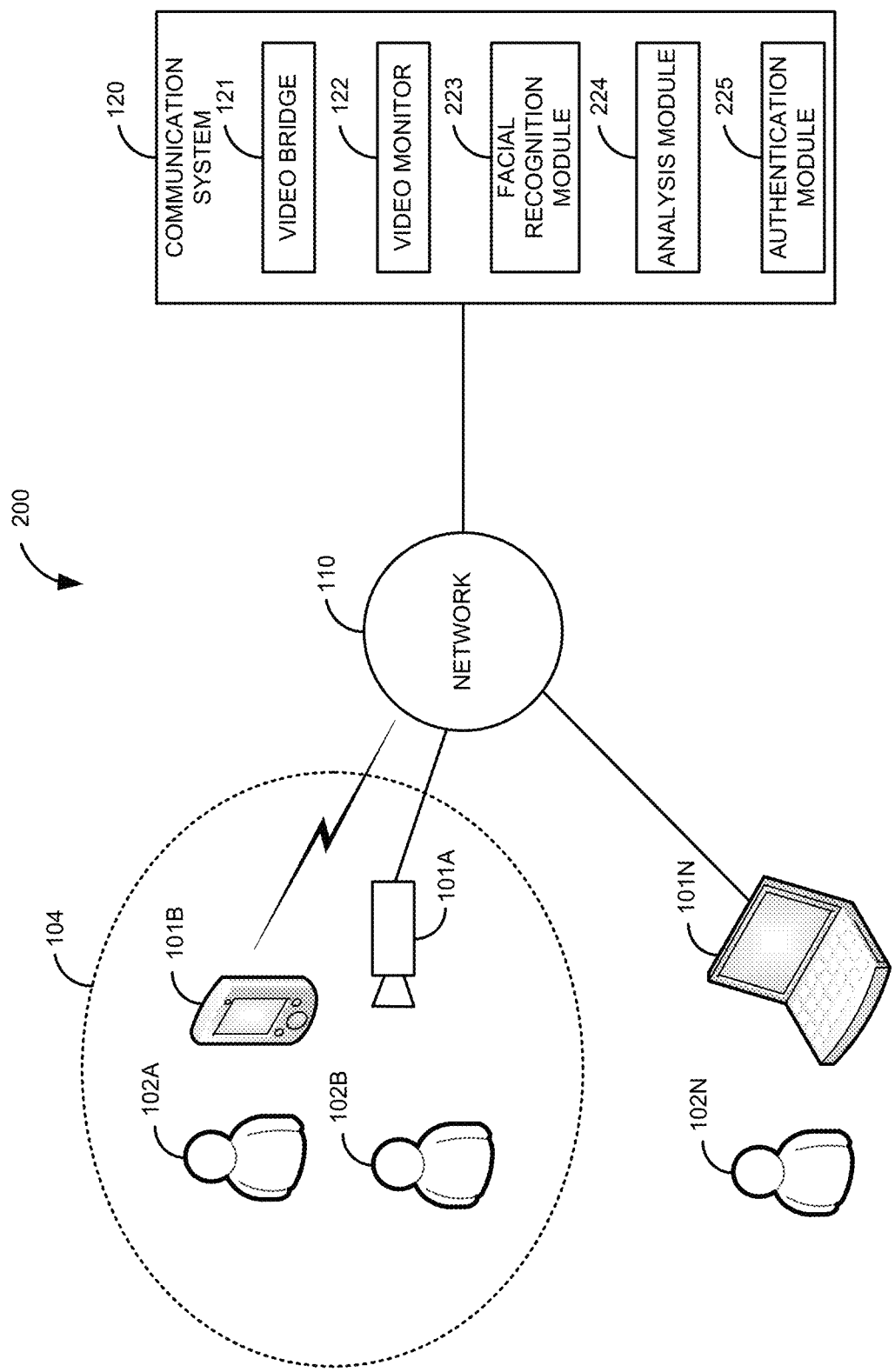
FIG. 2 is a block diagram of a second illustrative system for not displaying duplicate images in a video conference.

FIG. 2 is a block diagram of a second illustrative system 200 for not displaying duplicate images in a video conference. The second illustrative system 200 comprises the video devices 101A-101N, the participants 102A-102N, the conference room 104, the network 110, and the communication system 120.

The communication system 120 comprises the video bridge 121, the video monitor 122, a facial recognition module 223, an analysis module 224, and an authentication module 225. The facial recognition module 223 can be any hardware/software than can provide facial recognition. The analysis module 224 can be any hardware/software that can analyze a video communication.

The authentication module 225 can be any hardware/software that can authenticate a participant in a video conference. The authentication module 225 can authenticate a participant in various ways, such as based on an authentication code, based on a password, based on a voice print, based on facial recognition, based on biometrics, and/or the like.

The second illustrative system 200 can perform the same process described in FIG. 1. In an embodiment, the video monitor 122 can use the facial recognition module 223 to detect that the participant 102A's image is being captured by the first video device 101A and the second video device 101B in the video conference. The facial recognition module 223 uses facial recognition to detect that the same participant 102A is being captured in the video conference.

In an embodiment, the analysis module 224 determines that the participant 102A has become a presenter in the video conference. The analysis module 224 can determine that the participant 102A is a presenter in various ways, such as based on the participant 102A speaking, based on the participant 102A bringing up a document or slide show during the video conference, and/or the like. In response to the participant 102A becoming a presenter in the video conference, the analysis module 224 can automatically display the participant 102A's image in the video conference.

In another embodiment, the analysis module 224 determines that the participant 102A has become the presenter. This may be based on an audio stream from the second video device 101B (e.g., the participant is speaking), an audio stream from the first video device, based on a visual input such as the person presenting a slide or the person's talking being detected visually, and/or based on the device being used with possible information about who is using the device. In response to one or more of these, the analysis module 224 can highlight the participant 102A's image from the first video device 101A. The analysis module 224 may highlight the participant 102A's image from the first video device 101A in various ways, such as by changing a color of the participant 102A's image, drawing a circle or square around the participant 102A's image, blurring the background around the participant 102A's image, and/or the like.

In another embodiment, the participant 102A logs into the video conference from the second video device 101B using the authentication module 225. As the participant 102A logs into the video conference, the authentication module 225 can receive information (e.g., from a database) associated with the participant 102A, such as the participant 102A's name or other information associated with the participant 102A. Other information associated with the participant may include the participant 102A's location, address, nickname, title, and/or the like.

The video monitor 122 determines a location of the participant 102A's image in a view of the video conference provided by the first video device 101A. In response to determining the location of the participant 102A's image, the video monitor 122 provides the name of the participant 102A by the location of the participant 102A's image in the view of the video conference provided by the first video device 101A. The location may be determined by facial recognition by comparing the image of the participant 102A from the video device 101A and the image of the participant 102A from the second video device 101B. Alternatively, voice recognition may be used. The video monitor 122 can use a voice print of the participant 102A and match a timing of the voice print with when the participant 102A is talking.

In another embodiment, other types of information may be displayed along with or instead of the name of the participant. The information displayed can comprise information such as, a location of the participant 102, an address, a nickname, a title, and/or the like. For example, the participant's title can be displayed along with or in place of the participant's name.

Figure 3:
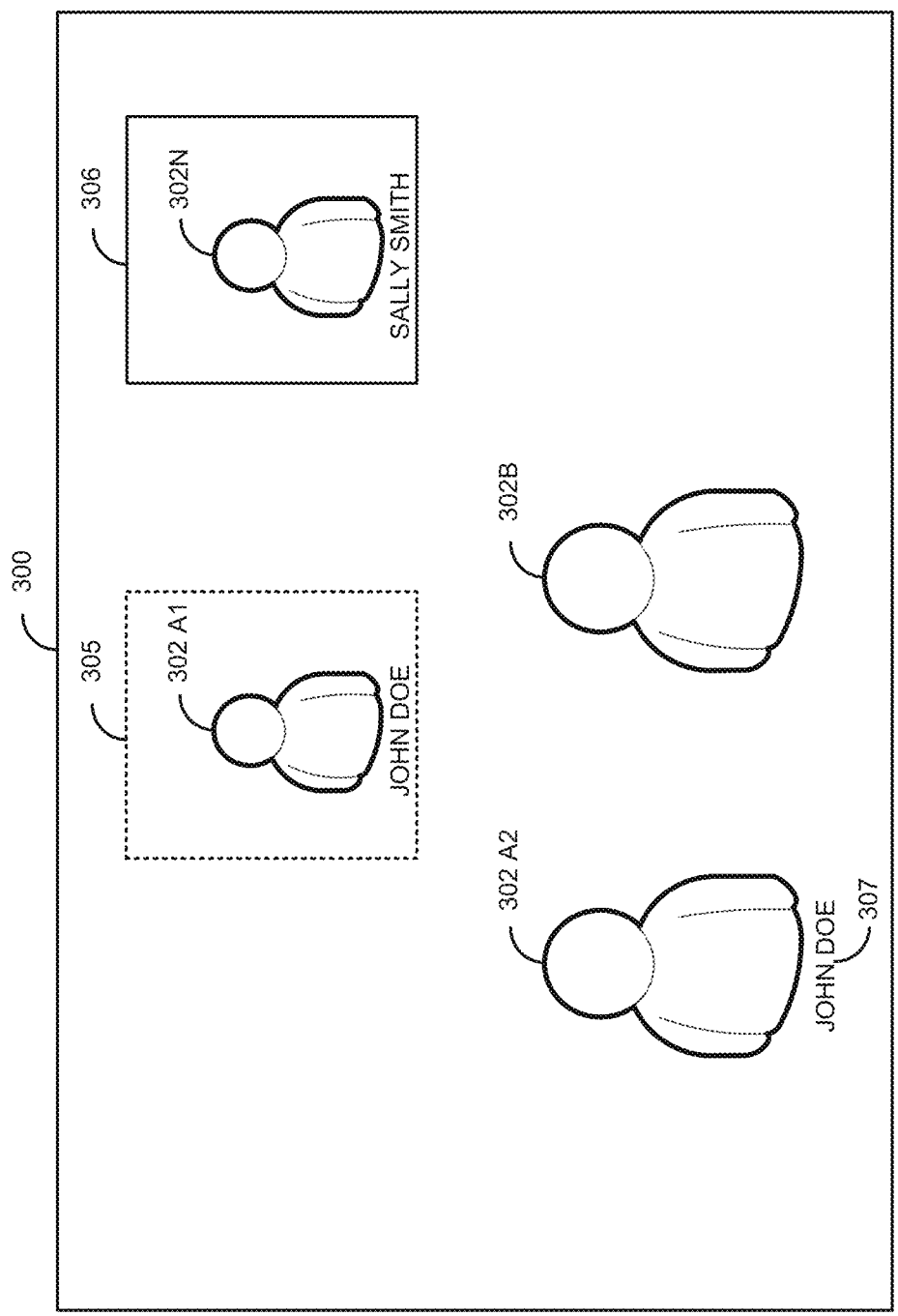
FIG. 3 is a diagram of a display of a video conference.

FIG. 3 is a diagram of a display 300 of a video conference. This embodiment is of a video conference established between the video devices 101B-101N and the video device 101A. The display 300 is a view that each of the participants 102A-102N would typically see when viewing the video conference. FIG. 3 comprises the participant 102A's image 302A1, the participant 102A's image 302A2, the participant 102B's image 302B, the participant 102N's image 302N, window 305, and window 306. The window 305 contains the participant 102A's image 302A1. The window 306 contains the participant 102N's image 302N.

In existing systems, the above described video conference would include the image of the participant 101A (302A2) and the image of participant 101B (302B) that are captured by the first video device 101A, the image of participant 102A (302A1 in window 305) that is captured by the second video device 101B, and the image of participant 102N (302N in window 306) that is captured by the video device 101N.

In one embodiment, the video monitor 122 detects that the participant 102A's image 302A2 is being captured by the first video device 101A and the participant 102A's image 302A1 is being captured by the second video device 101B. In response, the video monitor 122 automatically forbears from displaying the participant 102A's image 302A1 in the window 305. This is illustrated by the broken lines in window 305 to indicate that the window 305 may or may not be displayed. Alternatively, the video monitor could forbear from displaying the participant 102A image 302A2 instead.

The analysis module 224 can detect that the participant 102A is presenting in the video conference. In response, the analysis module 224 can display the participant 102A's image 302A1 in the window 305. Alternatively, the analysis module 224 can highlight the participant 102A's image 302A2.

The authentication module 225 can receive a name 307 of the participant 102A based on the participant 102A logging into the video conference. The video monitor 122 determines the location of the participant 102A's image (302A2) in the view provided by first video device 101A. The video monitor 122 provides the name 307 in a location by the participant 102A's image 302A2 in the view of the video conference provided by the first video device 101A. In FIG. 3, the name 307 is provided below the participant 102A's image 302A2. However, in other embodiments, the name 307 may be shown on the side of the participant 102A's image 302A2, above the participant 102A's image 302A2, on top of participant 102A's image 302A2, and/or the like.

Figure 4:
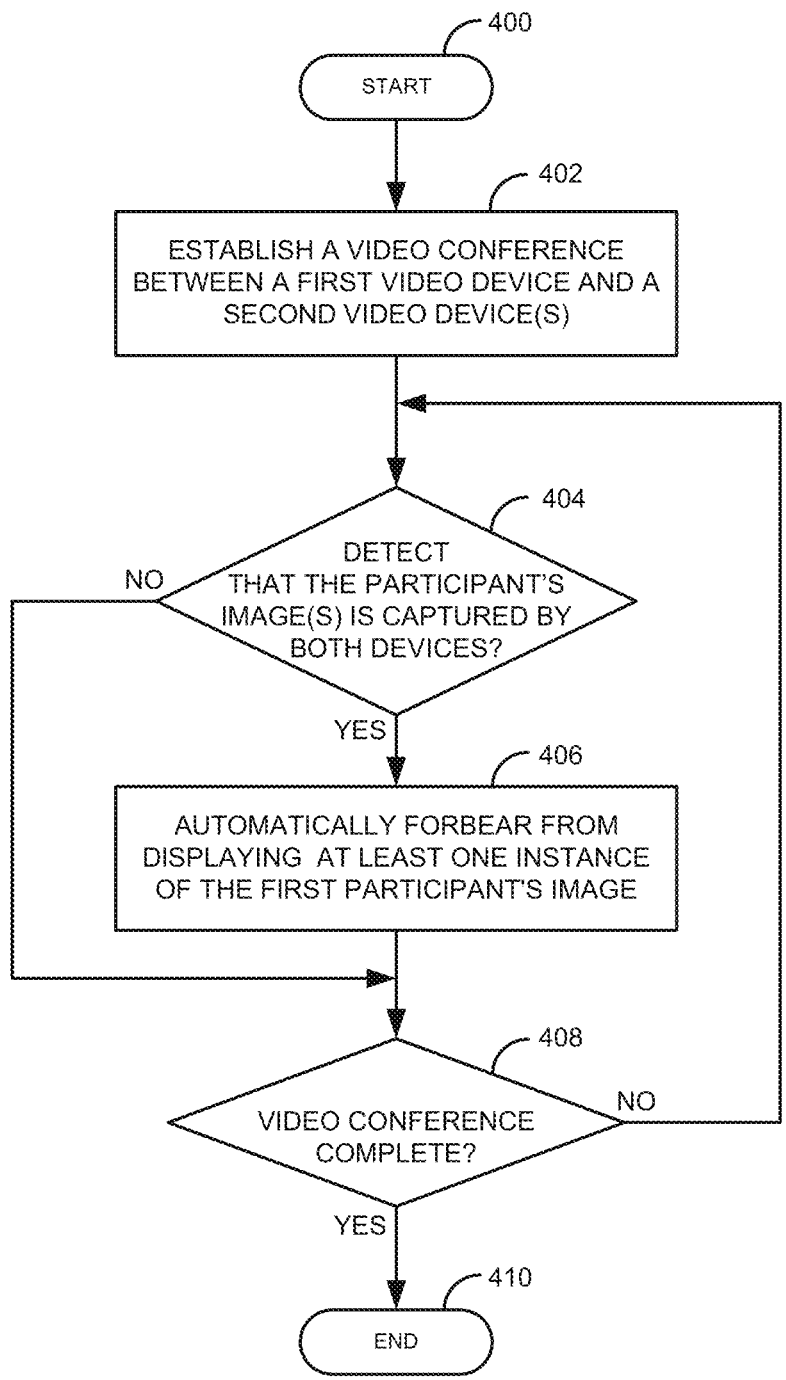
FIG. 4 is a flow diagram of a process for not displaying duplicate images in a video conference.
Figure 5:
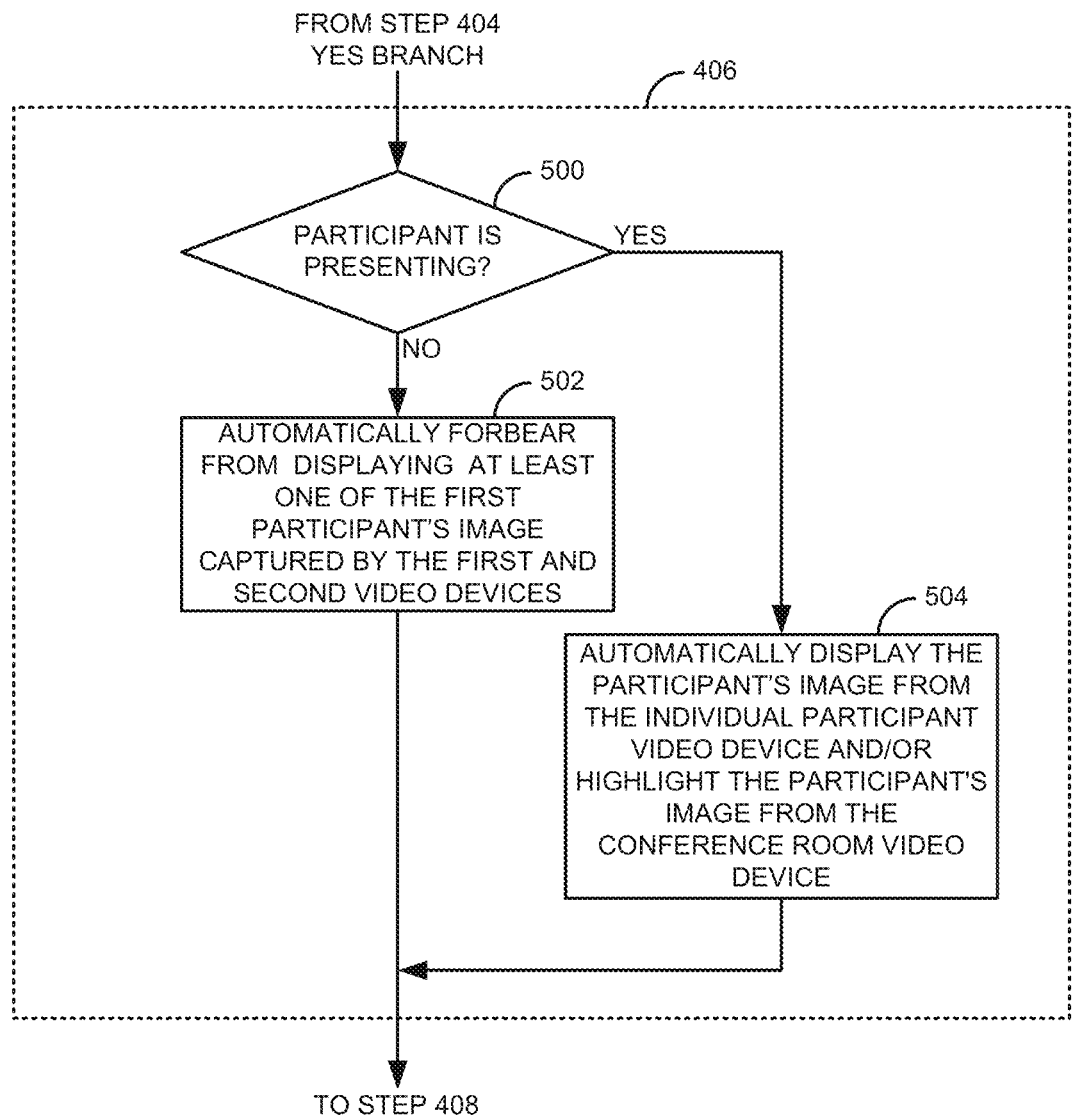
FIG. 5 is a flow diagram of a process for displaying a video stream of a presenter of a video conference.
Figure 6:
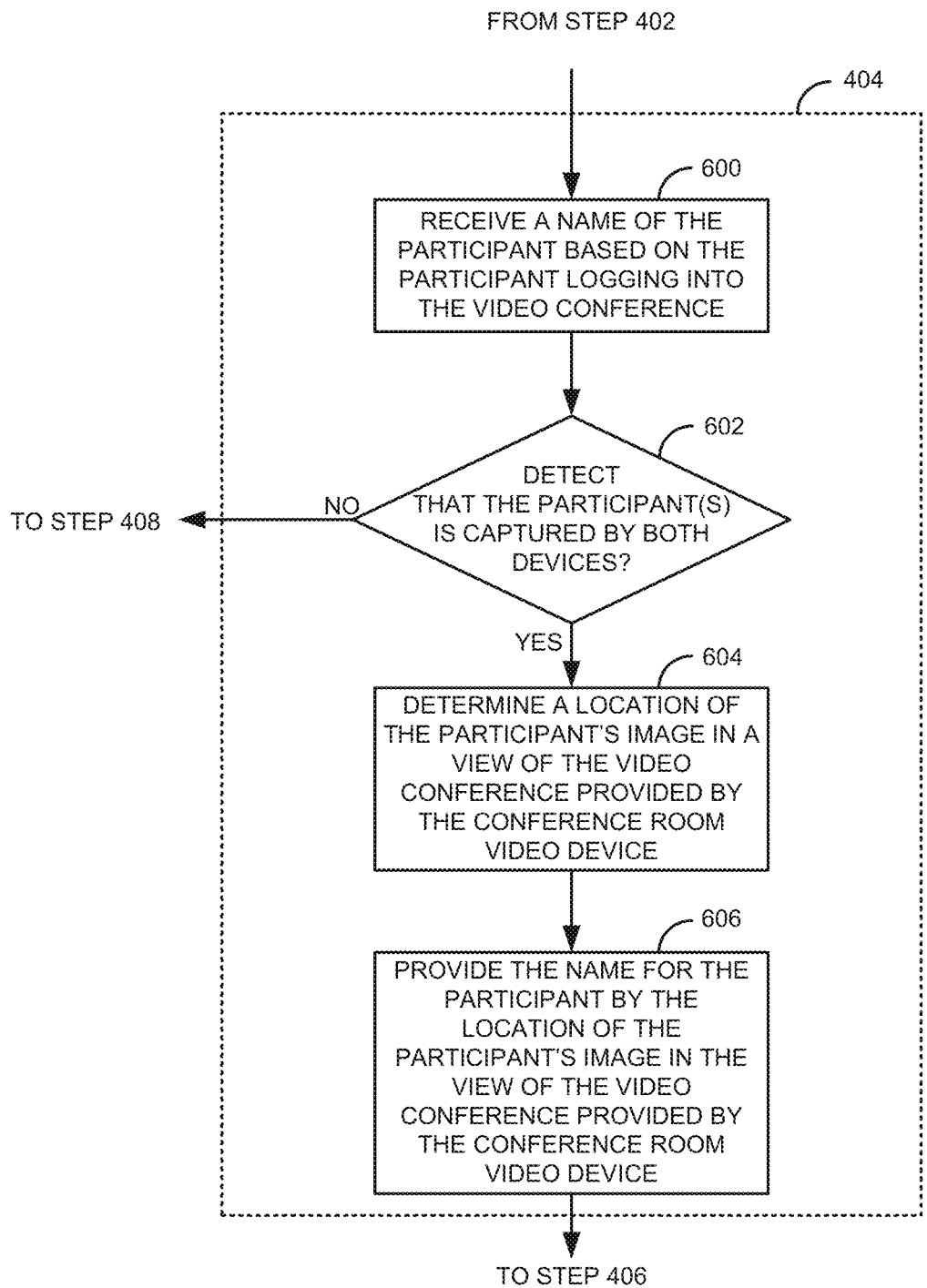
FIG. 6 is a flow diagram of a process for naming participants in a video conference room.

FIG. 4 is a flow diagram of a process for not displaying duplicate images in a video conference. Illustratively, the video devices 101, the communication system 120, the video bridge 121, the video monitor 122, the facial recognition module 223, the analysis module 224, and the authentication module 225 are stored-program-controlled entities, such as a computer or processor, which performs the method of FIGS. 4-6 and the processes described herein by executing program instructions stored in a tangible computer readable storage medium, such as a memory or disk. Although the methods described in FIGS. 4-6 are shown in a specific order, one of skill in the art would recognize that the steps in FIGS. 4-6 may be implemented in different orders and/or be implemented in a multi-threaded environment. Moreover, various steps may be omitted or added based on implementation.

The process starts in step 400. The process establishes a video conference between a first video device and a second video device(s) in step 402. The first video device captures at least a first participant's (and optionally a second participant's image) in the video conference. The first participant's image is also captured as part of the video conference via the second video device.

The process detects, in step 404, if the first participant's image is being captured by the first video device and the second video device in the video conference. If the first participant's image is not being captured by the first video device and the second video device in the conference in step 404, the process goes to step 408. Otherwise, if the first participant's image is being captured by the first video device and the second video device in the video conference in step 404, the process automatically forbears from displaying at least one instance of the first participant's image captured by the first video device and the second video device.

The process determines in step 408 if the video conference is complete in step 408. The video conference may be complete in various ways, such as a moderator ending the conference, based on all the participants exiting the conference, based on a defined number of participants leaving the conference and/or the like. If the video conference is not complete in step 408, the process goes to step 404. By going to step 404, the process can repeat. For example, if another participant joins the video conference in the conference room (and is captured by the first video device) and also joins the video conference via another second video device, the process can forbear from displaying the other participant's image received from the other participant's video device. If the process determines in step 408 that the video conference is complete, the process ends in step 410.

FIG. 5 is a flow diagram of a process for displaying a video stream of a presenter of a video conference. The process of FIG. 5 is an exemplary embodiment of step 406 in FIG. 4. After detecting that the first participant's image is captured by the first video device and the second video device in step 404, the process determines in step 500 if the first participant is presenting in the video conference. If the first participant is not presenting in the video conference in step 500, the process automatically forbears from displaying at least one of the first participant's image captured by the first and second video devices in step 502. The process goes to step 408

If the process determines in step 500 that the participant is presenting in the video conference, the process, in one embodiment, automatically displays the participant's image from the second video device. In another embodiment, the process highlights the participant's image from the conference video device. The process can also do both of the steps described in step 504. The process goes to step 408.

FIG. 6 is a flow diagram of a process for naming participants in a video conference room. The process of FIG. 6 is an exemplary embodiment of step 404 in FIG. 4. After establishing the video conference in step 402, the process receives, in step 600, a name of the first participant based on the first participant logging into the video conference. The process detects, in step 602, if the first participant's image is being captured by the first video device and the second video device in the video conference. If the first participant's image is not being captured by the first video device and the second video device in the conference in step 602, the process goes to step 408.

Otherwise, if the first participant's image is being captured by the video conference room device and the second video device in the video conference in step 602, the process determines a location of the first participant's image in a view of the video conference provided by the first video device in step 604. The process provides the name for the participant by the location of the first participant in the view of the video conference provided by the first video device in step 606. The process goes to step 406.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   establishing, by a microprocessor, a video conference between a first video device having a first video camera, a second video device having a second video camera, and a third video device having a third video camera, wherein the first video device is a conference room video device, the second video device is an individual participant video device that is mobile, and the third video device is remote to the video conference room;
   receiving, by the microprocessor, a first video stream from the first video device that comprises a first participant's image in the video conference;
   receiving, by the microprocessor, a second video stream from the second video device that also comprises the first participant's image in the video conference;
   detecting, by the microprocessor, the first participant's image in the first video stream and the second video stream; and
   in response to detecting the first participant's image in the first video stream and the second video stream, automatically forbearing from sending for display, by the microprocessor, at least one of the first participant's image in the first video stream or the second video stream.

2. The method of claim 1, wherein detecting that the first participant's image in the first video stream and the second video stream is accomplished via facial recognition.

3. The method of claim 1, further comprising:
   determining, by the microprocessor, that the first participant has become a presenter in the video conference; and
   in response to the first participant becoming the presenter in the video conference, automatically sending for display, by the microprocessor, the forborne first participant's image.

4. The method of claim 1, further comprising:
   determining, by the microprocessor, that the first participant has become a presenter in the video conference based on an audio stream from the second video device; and
   in response to the first participant becoming the presenter in the video conference, highlighting, by the microprocessor, the first participant's image from the first video device.

5. The method of claim 1, further comprising:
   receiving, by the microprocessor, a name of the first participant based on the first participant logging into the video conference from the second device;
   determining, by the microprocessor, a location of the first participant's image in a view of the video conference provided by the first video device; and
   providing, by the microprocessor, the name for the first participant by the location of the first participant's image in the view of the video conference provided by the first video device.

6. The method of claim 5, wherein the location of the first participant's image in the view of the video conference provided by the first video device is determined by at least one of facial recognition and voice recognition.

7. The method of claim 1, wherein the first participant is provided an option to automatically forbear from displaying the first participant's image from the second video device.

8. The method of claim 1, wherein automatically forbearing from displaying the first participant's image from the second video device is accomplished at the second video device or at a device in a network.

9. The method of claim 1, wherein a second participant's image is forborne from being displayed based on the second participant's image being in the first video stream and in a third video stream from a fourth communication device in the video conference.

10. The method of claim 3, wherein determining that the first participant has become the presenter is based on the participant bringing up a document or slide show during the video conference.

11. The method of claim 4, wherein highlighting first participant's image from the first video device comprises one of drawing a circle or square around the first participant.

12. The method of claim 4, wherein highlighting first participant's image from the first video device comprises blurring a background around the first participant's image.

13. A system comprising:
   a microprocessor; and
   a computer readable medium, coupled with the microprocessor and comprising microprocessor readable and executable instructions that program the microprocessor to execute:
      a video bridge that establishes a video conference between a first video device having a first video camera, a second video device having a second video camera, and a third video device having a third video camera, wherein the first video device is a conference room video device, the second video device is an individual participant video device that is mobile, and the third video device is remote to the video conference room, receives a first video stream from the first video device that comprises a first participant's image in the video conference, and receives a second video stream from the second video device that comprises the first participant's image in the video conference; and a video monitor that detects that the first participant's image in the first video stream and the second video stream and automatically forbears from sending for display at least one of the first participant's image in the first video stream or the second video stream in response to detecting that the first participant's image is in the first video stream and the second video stream.

14. The system of claim 13, wherein detecting that the first participant's image in the first video stream and the second video stream is accomplished via facial recognition.

15. The system of claim 13, further comprising an analysis module that determines that the first participant has become a presenter in the video conference and automatically sends for display the forborne first participant's image in response to the first participant becoming the presenter in the video conference.

16. The system of claim 13, further comprising an analysis module that determines that the first participant has become a presenter in the video conference based on an audio stream from the second video device and highlights the first participant's image from the first video device in response to the first participant becoming the presenter in the video conference.

17. The system of claim 13, further comprising:
an authentication module that receives a name of the first participant based on the first participant logging into the video conference from the second device; and
the video monitor further determines a location of the first participant's image in a view of the video conference provided by the first video device and provides the name for the first participant by the location of the first participant's image in the view of the video conference provided by the first video device.

18. The system of claim 17, wherein the location of the first participant's image in the view of the video conference provided by the first video device is determined by at least one of facial recognition and voice recognition.

19. The system of claim 13, wherein the first participant is provided an option to automatically forbear from displaying the first participant's image from the second video device.

20. The system of claim 13, wherein automatically forbearing from displaying the video stream of the first participant from the second video device is accomplished at the second video device or at a device in a network.

* * * * *